(12) United States Patent
Yoshinaga

(10) Patent No.: US 11,419,305 B2
(45) Date of Patent: Aug. 23, 2022

(54) EXCREMENT TREATMENT MATERIAL

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 0 days.

(21) Appl. No.: 16/805,146

(22) Filed: Feb. 28, 2020

(65) Prior Publication Data
US 2020/0196563 A1   Jun. 25, 2020

Related U.S. Application Data

(63) Continuation of application No. PCT/JP2018/031329, filed on Aug. 24, 2018.

(30) Foreign Application Priority Data

Oct. 17, 2017 (JP) ............................. JP2017-200694

(51) Int. Cl.
| | | |
|---|---|---|
| *A01K 1/01* | (2006.01) | |
| *A01K 1/015* | (2006.01) | |
| *B65D 33/00* | (2006.01) | |
| *B65D 75/58* | (2006.01) | |

(52) U.S. Cl.
CPC ............. *A01K 1/0155* (2013.01); *A01K 1/01* (2013.01); *B65D 33/00* (2013.01); *B65D 75/58* (2013.01)

(58) Field of Classification Search
CPC ........ A01K 1/0155; A01K 1/01; B65D 33/00; B65D 75/58
USPC ........................................................... 383/40
See application file for complete search history.

(56) References Cited

U.S. PATENT DOCUMENTS

| | | | | |
|---|---|---|---|---|
| 1,965,040 A | * | 7/1934 | Kelly ................... | F24B 15/007 209/370 |
| 3,159,096 A | * | 12/1964 | Tocker .................. | B65D 33/30 100/211 |
| 4,576,316 A | * | 3/1986 | Foster ................ | B65D 75/5894 206/484 |
| 4,889,619 A | * | 12/1989 | Lynch ...................... | B07B 1/00 209/374 |
| 5,709,479 A | * | 1/1998 | Bell ...................... | B65D 75/008 383/10 |
| 5,779,894 A | * | 7/1998 | Martensson ........... | B65D 75/38 210/232 |
| 5,785,428 A | * | 7/1998 | Mazzocchi ............ | B65D 33/01 383/103 |
| 5,958,483 A | * | 9/1999 | Anders ................ | B65D 33/007 426/112 |
| 6,089,190 A | * | 7/2000 | Jaffee .................... | A01K 1/0155 119/172 |

(Continued)

FOREIGN PATENT DOCUMENTS

JP   2010-158253 A   7/2010

*Primary Examiner* — Peter N Helvey
(74) *Attorney, Agent, or Firm* — Oliff PLC

(57) ABSTRACT

An excrement treatment material includes a plurality of granules, and a packaging bag. The granules are granules for treating excrement. The plurality of granules are accommodated in the packaging bag. A partition member is provided in the packaging bag. The partition member partitions the interior of the packaging bag into a first space and a second space, and has a hole that does not allow the granules to pass through. The plurality of granules are accommodated, among the first space and the second space, only in the first space.

11 Claims, 11 Drawing Sheets

(56) References Cited

U.S. PATENT DOCUMENTS

| | | | | |
|---|---|---|---|---|
| 6,126,318 | A * | 10/2000 | Bell | B65D 75/008 |
| | | | | 222/105 |
| 6,702,461 | B2 * | 3/2004 | Vangedal-Nielsen | |
| | | | | B65D 81/261 |
| | | | | 210/464 |
| 6,783,276 | B2 * | 8/2004 | Machacek | B65D 33/2591 |
| | | | | 383/36 |
| 7,806,593 | B2 * | 10/2010 | Toporski | A01D 43/063 |
| | | | | 383/33 |
| 8,764,990 | B1 * | 7/2014 | Julian | B65F 1/06 |
| | | | | 210/767 |
| 8,944,684 | B2 * | 2/2015 | Bell | B65D 33/25 |
| | | | | 383/5 |
| 9,221,584 | B2 * | 12/2015 | Kleyner | B29C 66/4312 |
| 10,589,904 | B2 * | 3/2020 | Farstad | B65D 33/01 |
| 2004/0120607 | A1 * | 6/2004 | Goren | B65D 33/14 |
| | | | | 383/22 |
| 2007/0065544 | A1 * | 3/2007 | Howell, III | B65D 33/01 |
| | | | | 426/112 |
| 2009/0294336 | A1 * | 12/2009 | Jassim | B29C 66/21 |
| | | | | 209/422 |
| 2017/0202175 | A1 * | 7/2017 | Takagi | A01K 1/0155 |
| 2018/0155107 | A1 * | 6/2018 | Yoshinaga | A01K 1/015 |

\* cited by examiner

EXCREMENT TREATMENT MATERIAL

CROSS REFERENCE TO RELATED APPLICATION

This is a Continuation of International Application No. PCT/JP2018/031329 filed Aug. 24, 2018, which claims the benefit of Japanese Application No. 2017-200694 filed Oct. 17, 2017. The contents of these applications are hereby incorporated by reference in their entirety.

TECHNICAL FIELD

The present invention relates to an excrement treatment material.

BACKGROUND ART

As a conventional excrement treatment material, for example, there is the excrement treatment material described in Patent Document 1. The excrement treatment material described in Patent Document 1 is provided with a plurality of granules that absorb and treat human or animal excrement. These granules are shipped collectively accommodated in one packaging bag.

CITATION LIST

Patent Document

Patent Document 1: JP 2010-158253A

SUMMARY OF INVENTION

Technical Problem

Accommodating a plurality of granules in a packaging bag in this way contributes to the convenience of transportation and storage and the like of the excrement treatment material. However, when the granules rub against each other during transportation or the like, or the granules rub against the packaging bag, a part of each granule may peel off. The part peeled off becomes dust and accumulates within the packaging bag. Therefore, there is a problem that when taking the granules out of the packaging bag after opening the packaging bag, the dust is released to the outside of the packaging bag together with the granules.

Solution to Problem

The present invention has been made in view of the above-described problem, and it is an object thereof to provide an excrement treatment material making it less likely that dust accumulated in a packaging bag will be released to outside the packaging bag.

An excrement treatment material according to the present invention includes a plurality of granules for treating excrement, and a packaging bag where the plurality of granules are accommodated. The packaging bag is provided with a partition member that partitions the interior of the packaging bag into a first space and a second space, and has a hole that does not allow the granules to pass through. The plurality of granules are accommodated, among the first space and the second space, only in the first space.

In this excrement treatment material, the interior of the packaging bag is partitioned into the first space and the second space by the partition member having the hole that does not allow the granules to pass through. The plurality of granules are accommodated, among the first space and the second space, only in the first space. Therefore, even when a part of the granules accommodated in the first space peels off and becomes dust, that dust can be moved to the second space through the hole of the partition member. Thus, by accumulating dust in a space (the second space) different from the space (the first space) where the granules are accommodated, when taking the granules out of the packaging bag after opening the packaging bag, it is less likely that the dust will be released to outside the packaging bag.

Advantageous Effects of Invention

According to the present invention, an excrement treatment material making it less likely that dust accumulated in a packaging bag will be released to outside the packaging bag is realized.

DESCRIPTION OF EMBODIMENTS

Following is a detailed description of embodiments of the present invention, with reference to the attached drawings. Note that in the description of the drawings, the same elements are denoted by the same reference symbols, with redundant description omitted.

First Embodiment

Figure 1:
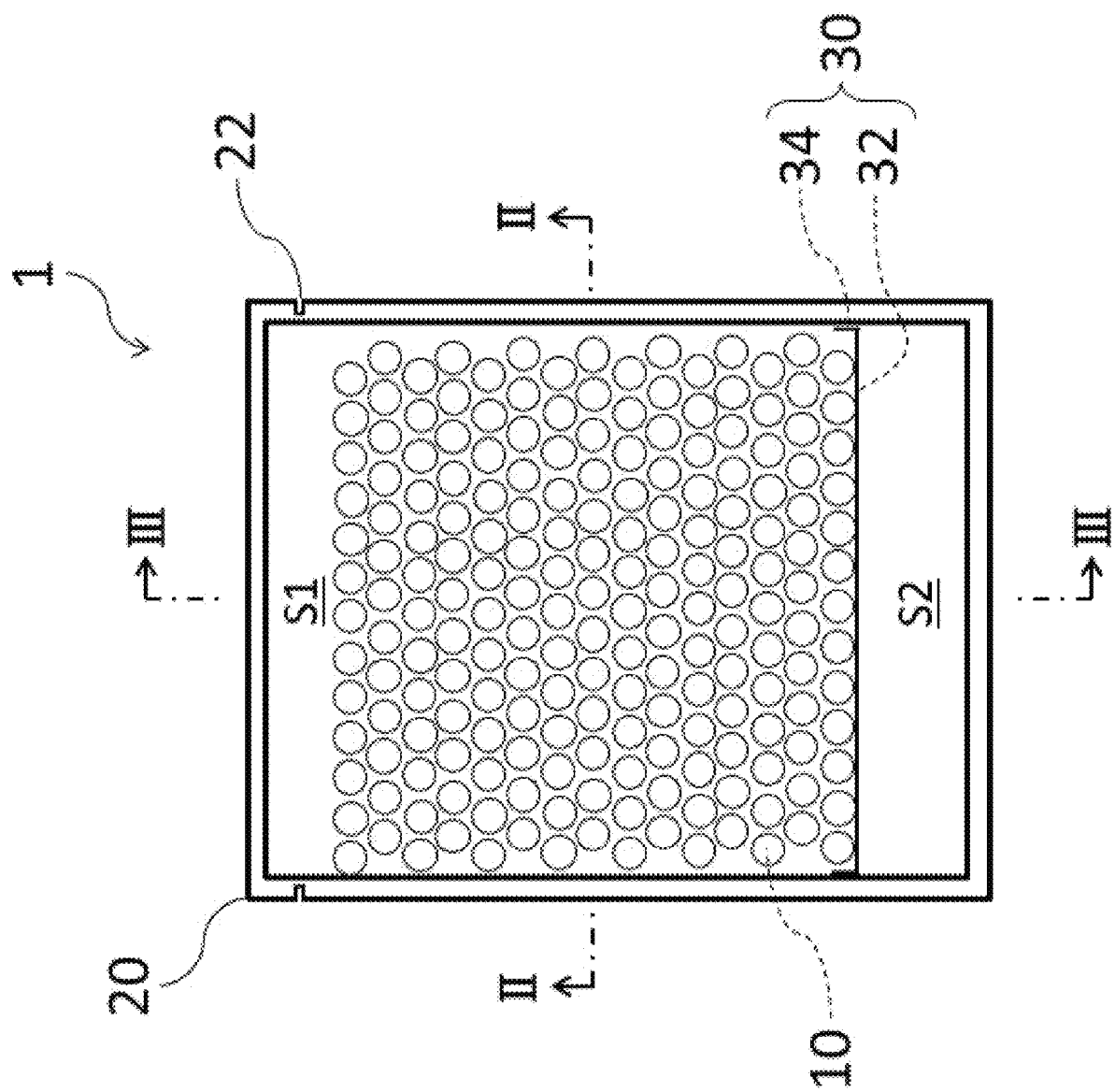
FIG. 1 is a front view showing a first embodiment of an excrement treatment material according to the present invention.
Figure 2:
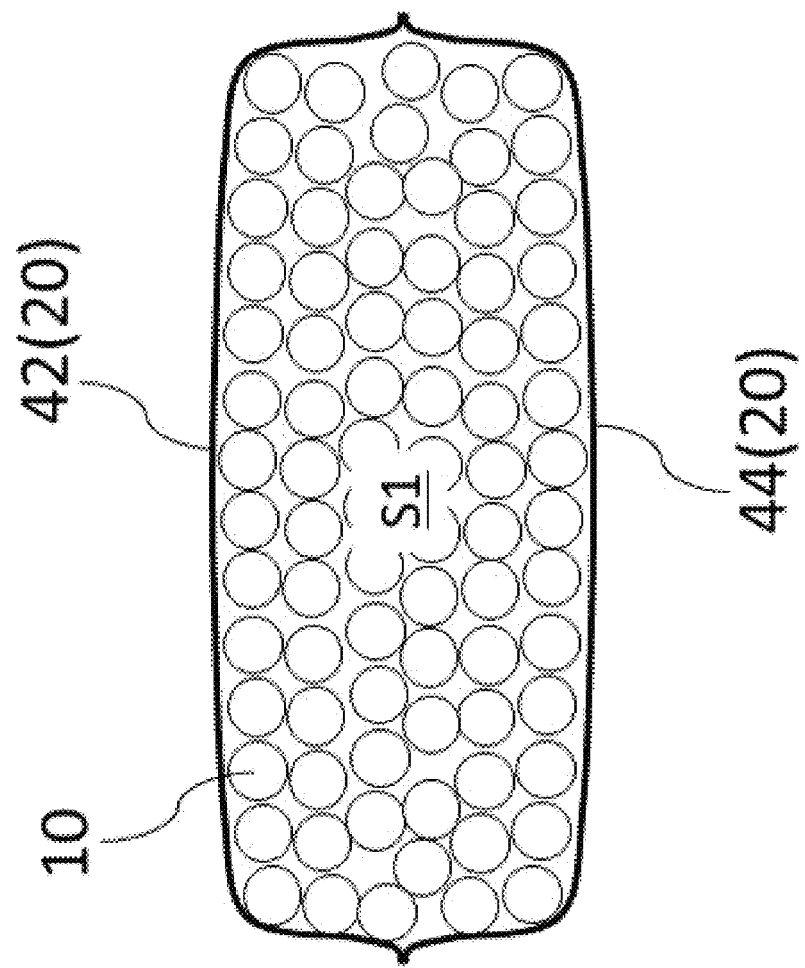
FIG. 2 is a schematic view showing an end face along a line II-II in FIG. 1.
Figure 3:
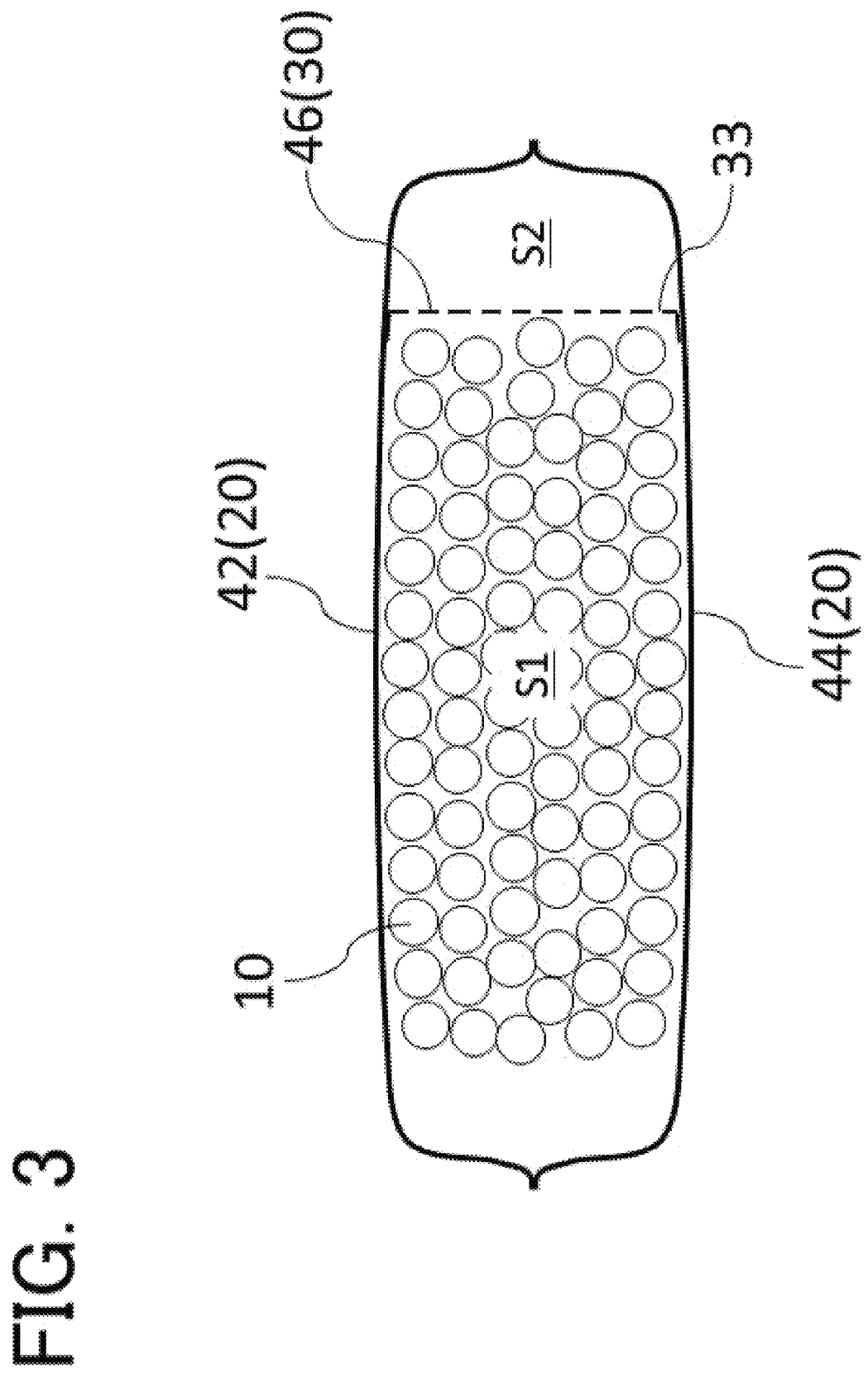
FIG. 3 is a schematic view showing an end face along a line III-III in FIG. 1.

FIG. 1 is a front view showing a first embodiment of an excrement treatment material according to the present invention. Also, FIGS. 2 and 3 respectively are schematic views showing an end face along a line II-II and a line III-III in FIG. 1. An excrement treatment material 1 is an excrement treatment material used for treating human or animal excrement, and includes a plurality of granules 10 and a packaging bag 20. In FIG. 1, for ease of viewing, the interior of the packaging bag 20 is shown with the packaging bag 20 made transparent, and a part of a partition member 30 described later is not shown.

Figure 4:
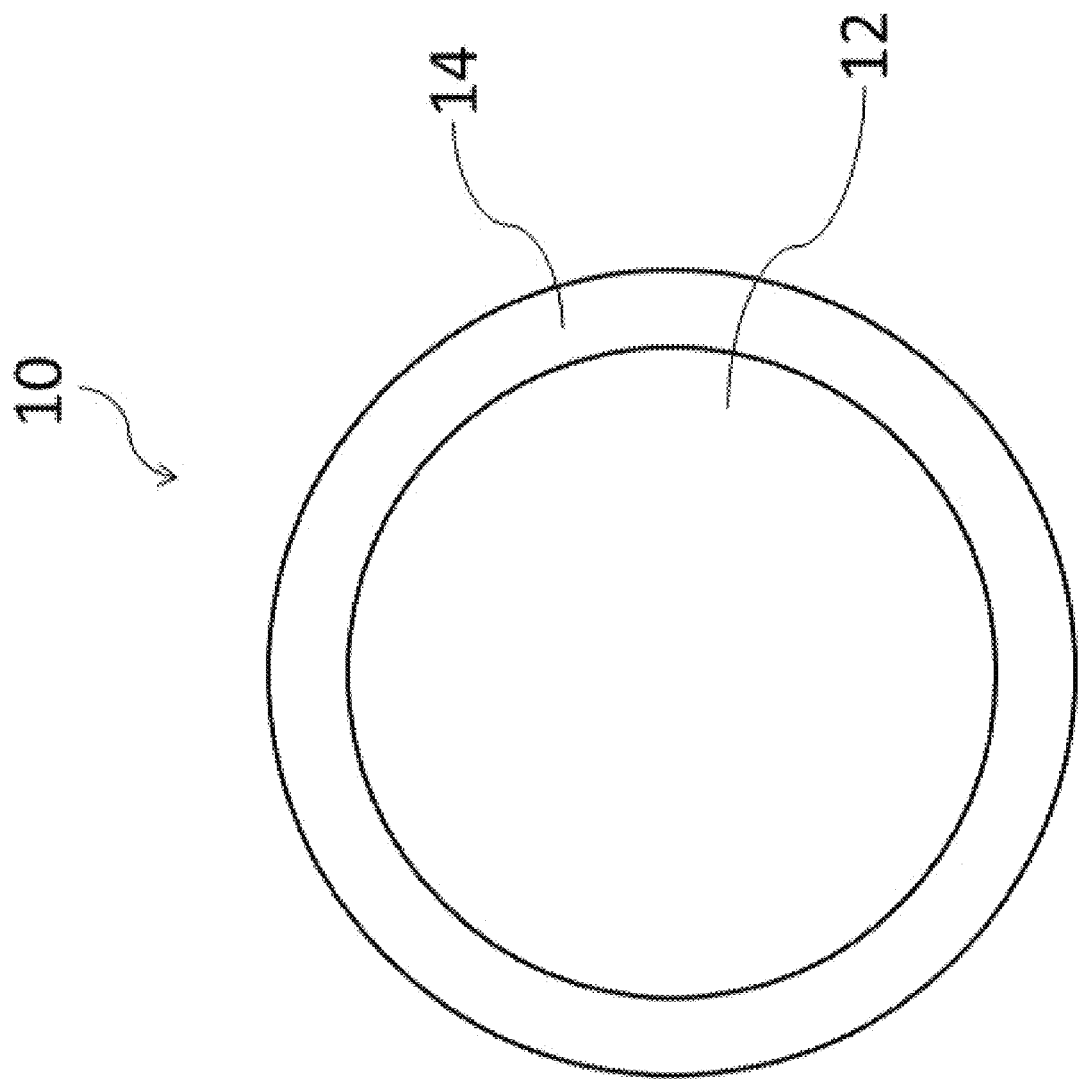
FIG. 4 is a schematic view showing a granule 10.

FIG. 4 is a schematic view showing the granule 10. The granules 10 are granules for treating excrement. In the present embodiment, the granules 10 treat the excrement by absorbing the excrement. The grain diameter of the granules 10 is, for example, about 5 to 15 mm. Each granule 10 has a core portion 12 and a coating portion 14. The core portion 12 is formed into a granular shape. Examples of such a granular shape include a sphere, a cylinder, and an ellipsoid. The core portion 12 has a function of absorbing and retaining water of the excrement. The core portion 12 preferably has an organic substance as a main material. Here, the main material of the core portion 12 means, among the materials constituting the core portion 12, a material having the largest weight ratio in the core portion 12. As the organic substance, for example, papers, used tea leaves, plastics, or bean curd lees can be used.

'Papers' refers to a material mainly composed of pulp. Examples of papers include, in addition to ordinary paper, classified PVC paper (paper obtained by classifying PVC wallpaper), fluff pulp, papermaking sludge, pulp sludge, and the like. As plastics, for example, a classified paper diaper (a plastic obtained by classifying a paper diaper) may be used. The bean curd lees are preferably dry bean curd lees.

The coating portion 14 covers the core portion 12. The coating portion 14 may cover the entire surface of the core portion 12, or may cover only a part of the surface of the core portion 12. The coating portion 14 has a function of adhering together the granules 10 that have absorbed the excrement when used, thereby forming a mass. The coating portion 14 contains an adhesive material. As such an adhesive material, for example, starch, CMC (carboxymethylcellulose), PVA (polyvinyl alcohol), dextrin, or a water-absorbing polymer can be used. The coating portion 14 also preferably has an organic substance as a main material.

The granules 10 can be formed, for example, as follows. First, the material constituting the core portion 12 (core portion material) is pulverized to a predetermined size by a pulverizer, and then introduced into a mixer at a predetermined ratio and mixed. Then, after water is added as required, the core portion material is extruded and granulated by a granulator. As a result, a plurality of the core portions 12 formed in a granular shape are obtained. Next, a coating portion 14 is formed so as to cover each core portion 12. Specifically, the coating portion 14 is formed by affixing a powdery material (coating material) constituting the coating portion 14 to the surface of the core portion 12 using a coating apparatus or the like. Affixing of the coating material can be performed, for example, by scattering or spraying. Thereafter, the granules obtained in this way are sieved with a sieve having a predetermined size to extract only the granules satisfying a predetermined standard. Then, the extracted granules are dried with a dryer. In this way, a plurality of the granules 10 are formed.

Returning to FIGS. 1 to 3, the plurality of granules 10 are accommodated in the packaging bag 20. The packaging bag 20 is provided with the partition member 30. The partition member 30 partitions the interior of the packaging bag 20 into a space S1 (a first space) and a space S2 (a second space). The space S1 is a space surrounded by a part of the packaging bag 20 (a part above the partition member 30) and the partition member 30. The space S2 is a space surrounded by a part of the packaging bag 20 (a part below the partition member 30) and the partition member 30. The plurality of granules 10 are accommodated, among the space S1 and the space S2, only in the space S1. That is, all of the granules 10 are accommodated in the space S1. In the space S2, none of the granules 10 are accommodated. The space S2 is a space where dust, which will be described later, accumulates.

The partition member 30 includes a body portion 32 and a fixed portion 34. The body portion 32 is a portion constituting a boundary between the space S1 and the space S2. The body portion 32 extends in a plane perpendicular to the vertical direction (equivalent to the vertical direction in FIG. 1) of the packaging bag 20. The fixed portion 34 is a portion for fixing the partition member 30 to the inner face of the packaging bag 20. The fixed portion 34 is provided in an annular shape at the periphery of the body portion 32. The fixed portion 34 is provided standing perpendicularly from the periphery of the body portion 32, and is adhered to the inner face of the packaging bag 20. Specifically, the entire fixed portion 34 is adhered to the inner face of the packaging bag 20.

The partition member 30 is provided near the lower end of the packaging bag 20. That is, the distance from the partition member 30 to the lower end of the packaging bag 20 is less than the distance from the partition member 30 to the upper end of the packaging bag 20. Thus, the volume of the space S2 is smaller than the volume of the space S1. The volume of the space S2 is preferably 20% or less of the volume of the space S1, and more preferably 10% or less of the volume of the space S1. Here, the volume of each of the spaces S1 and S2 is the volume when the interior of the packaging bag 20 in an empty state (a state in which the granules 10 are not accommodated) has been filled with air.

The packaging bag 20 includes a sheet member 42 (a first sheet member), a sheet member 44 (a second sheet member), and a sheet member 46 (a third sheet member). The sheet member 42 constitutes a front face of the packaging bag 20. The sheet member 44 constitutes a back face of the packaging bag 20. Each of the sheet members 42 and 44 is composed of one sheet. The sheet member 42 and the sheet member 44 are bonded to each other at their edges. The sheet member 46 constitutes the partition member 30. The sheet member 46 may be composed of one sheet, or may be composed of two or more sheets. For example, a plastic such as polyethylene can be used as the material of each of the sheet members 42, 44, and 46.

The packaging bag 20 is provided with an opening mouth 22 for opening the packaging bag 20. The opening mouth 22 is formed by a notch formed at an end portion (a portion where the edge of the sheet member 42 and the edge of the sheet member 44 are bonded) of the packaging bag 20. In the present embodiment, the opening mouth 22 is provided on both the left and right sides of the packaging bag 20. The opening mouth 22 is located near the upper end of the packaging bag 20. The packaging bag 20 is configured such that by opening the packaging bag 20 from the opening mouth 22, among the space S1 and the space S2, only the space S1 is opened. Here, opening of the space S1 means that a state in which the entire space S1 is surrounded by a part of the packaging bag 20 and the partition member 30 is released. The same applies to the space S2.

Figure 5:
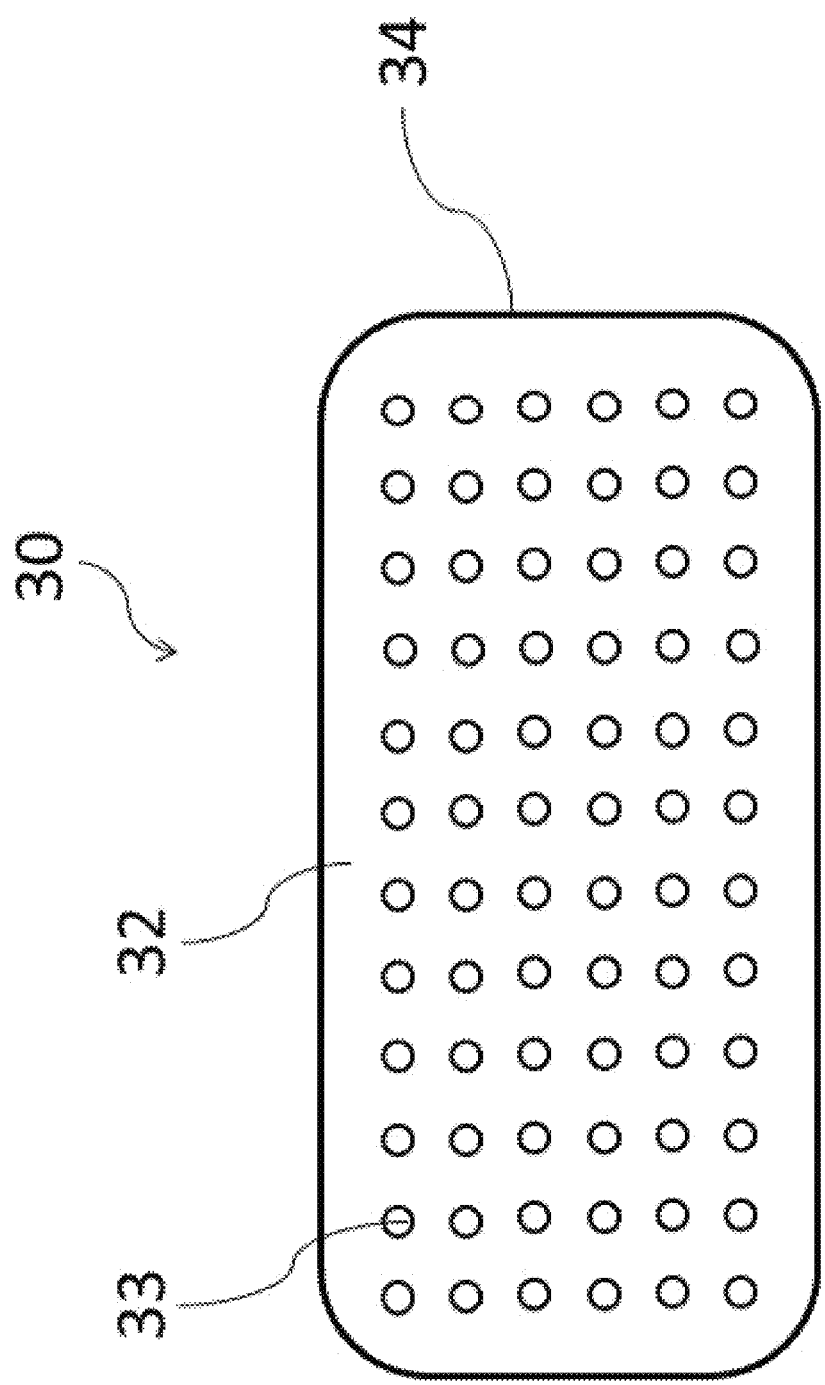
FIG. 5 is a plan view showing a partition member 30.

FIG. 5 is a plan view showing the partition member 30. The partition member 30 has a hole 33. The hole 33 does not allow the granules 10 to pass through. On the other hand, when a part of the granules 10 peels off and becomes dust, the hole 33 allows that dust to pass through. The hole 33 is circular in a plan view. The diameter of the hole 33 is, for example, about 1 to 3 mm. The partition member 30 has a plurality of the holes 33. The plurality of holes 33 are scattered over substantially all of the body portion 32 of the partition member 30. The space S1 and the space S2 communicate with each other only through the holes 33.

Figure 6:
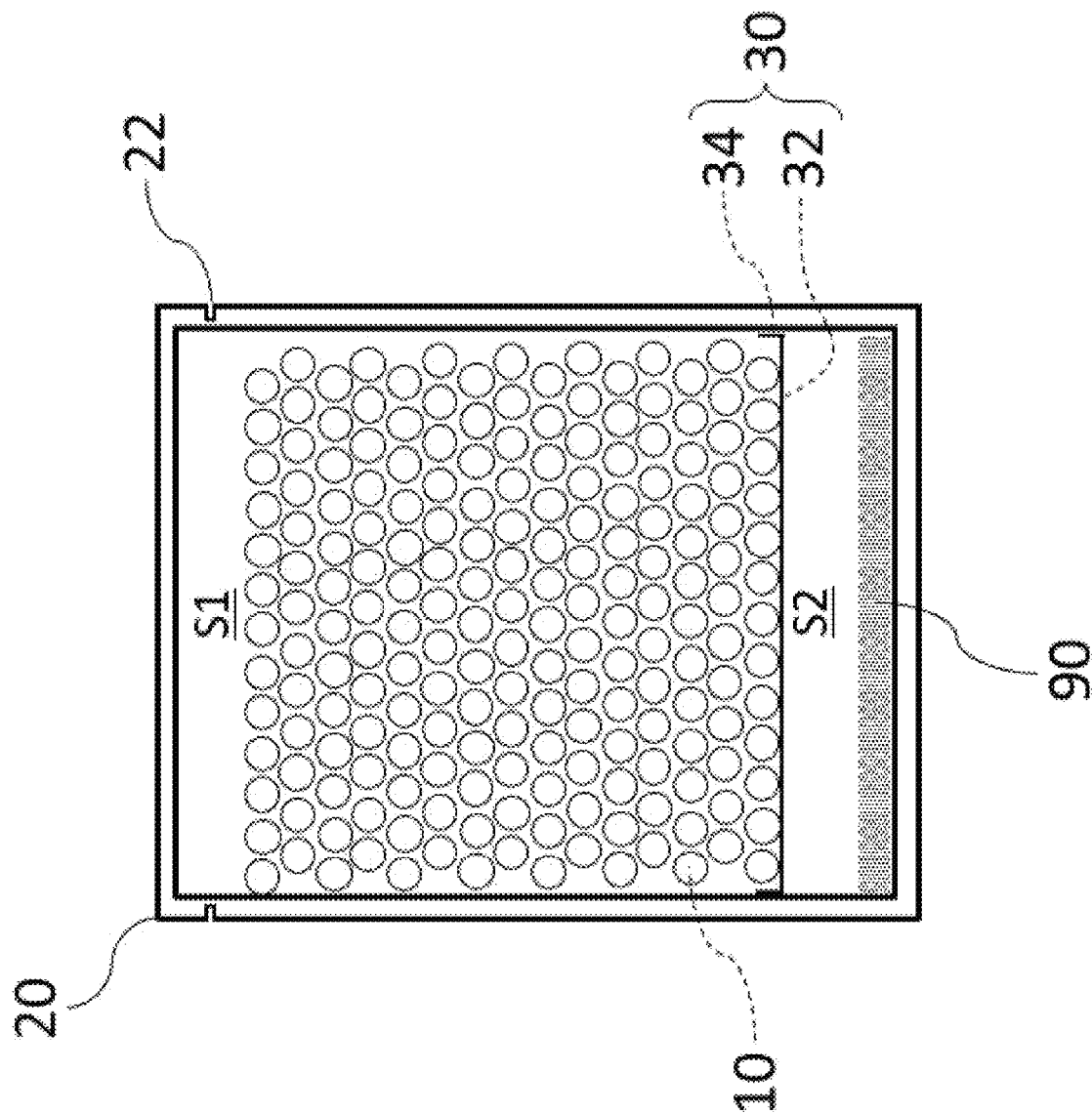
FIG. 6 is a view for explaining effects of an excrement treatment material 1.

Effects of the excrement treatment material 1 will now be described. In the excrement treatment material 1, the interior of the packaging bag 20 is partitioned into the space S1 and the space S2 by the partition member 30 having the holes 33 that do not allow the granules 10 to pass through. The plurality of granules 10 are accommodated, among the space S1 and the space S2, only in the space S1. Therefore, as shown in FIG. 6, even if a part of the granules 10 accommodated in the space S1 peels off and becomes a dust 90, some or all of the dust 90 can be moved to the space S2 through the holes 33 of the partition member 30. For example, by lightly shaking the packaging bag 20 with the lower end of the packaging bag 20 oriented downward before opening the packaging bag 20, the dust 90 may be prompted to move from the space S1 to the space S2. By accumulating the dust 90 in the space S2 different from the space S1 where the granules 10 are accommodated, when taking the granules 10 out of the packaging bag 20 after opening the packaging bag 20, it is less likely that the dust 90 will be released to outside the packaging bag 20. Therefore, the excrement treatment material 1 making it less likely that the dust 90 accumulated in the packaging bag 20 will be released to outside the packaging bag 20 is realized.

The volume of the space S2 is smaller than the volume of the space S1. Such a large volume of the space S1 is advantageous for accommodating a large amount of the granules 10 in the packaging bag 20. From this viewpoint, the volume of the space S2 is preferably 20% or less of the volume of the space S1, and more preferably 10% or less. However, if the volume of the space S2 is too small, a sufficient space for accumulating the dust 90 cannot be secured. From this viewpoint, it is preferable that the volume of the space S2 is 3% or more of the volume of the space S1.

The packaging bag 20 is configured such that by opening the packaging bag 20 from the opening mouth 22, among the space S1 and the space S2, only the space S1 is opened. Therefore, the granules 10 can be taken out of the packaging bag 20 without opening the space (the space S2) in which the dust is confined.

The partition member 30 has the body portion 32 and the fixed portion 34. By providing the fixed portion 34 in addition to the body portion 32 in this way, fixing of the partition member 30 to the inner face of the packaging bag 20 can be easily performed.

The body portion 32 has a flat shape, and extends in a plane that is perpendicular to the vertical direction of the packaging bag 20. Therefore, the interior of the packaging bag 20 can be partitioned vertically. Generally, a packaging bag of excrement treatment material is configured to be opened such that the upper end is opened. Therefore, if the interior of the packaging bag 20 is partitioned vertically and the upper space is used as the space S1, it is possible to open only the space S1 without changing the above configuration.

The fixed portion 34 is provided standing perpendicularly from the periphery of the body portion 32, and is adhered to the inner face of the packaging bag 20. By providing the fixed portion 34 standing perpendicularly in this way, the outer face of the fixed portion 34 can be opposed to the inner face of the packaging bag 20. Therefore, it becomes easy to adhere the fixed portion 34 to the inner face of the packaging bag 20.

The entire fixed portion 34 is adhered to the inner face of the packaging bag 20. Therefore, a gap can be prevented from occurring between the periphery of the body portion 32 and the inner face of the packaging bag 20.

The partition member 30 has a plurality of the holes 33. In this case, dust is allowed to move more easily from the space S1 to the space S2 than in a case where only one hole 33 is provided.

The plurality of holes 33 are scattered over substantially all of the body portion 32. Such a configuration is advantageous for facilitating movement of the dust from the space S1 to the space S2.

The packaging bag 20 has the sheet member 42, the sheet member 44, and the sheet member 46. By configuring the packaging bag 20 with the plurality of sheet members 42, 44, and 46 in this way, the packaging bag 20 provided with the partition member 30 can be easily formed.

Each granule 10 has the core portion 12 and the coating portion 14. In a granule 10 provided with the coating portion 14 in this manner, dust is likely to occur when the coating portion 14 peels off. Therefore, the excrement treatment material 1 in which it is less likely that the dust will be released to outside the packaging bag 20 is particularly useful.

When an organic substance is used as a main material in the core portion 12 and the coating portion 14, granules 10 that are suitable for incineration can be obtained. If the granules 10 are suitable for incineration in this way, the used granules 10 can be discarded as combustible waste, thereby improving convenience for a user.

Second Embodiment

Figure 7:
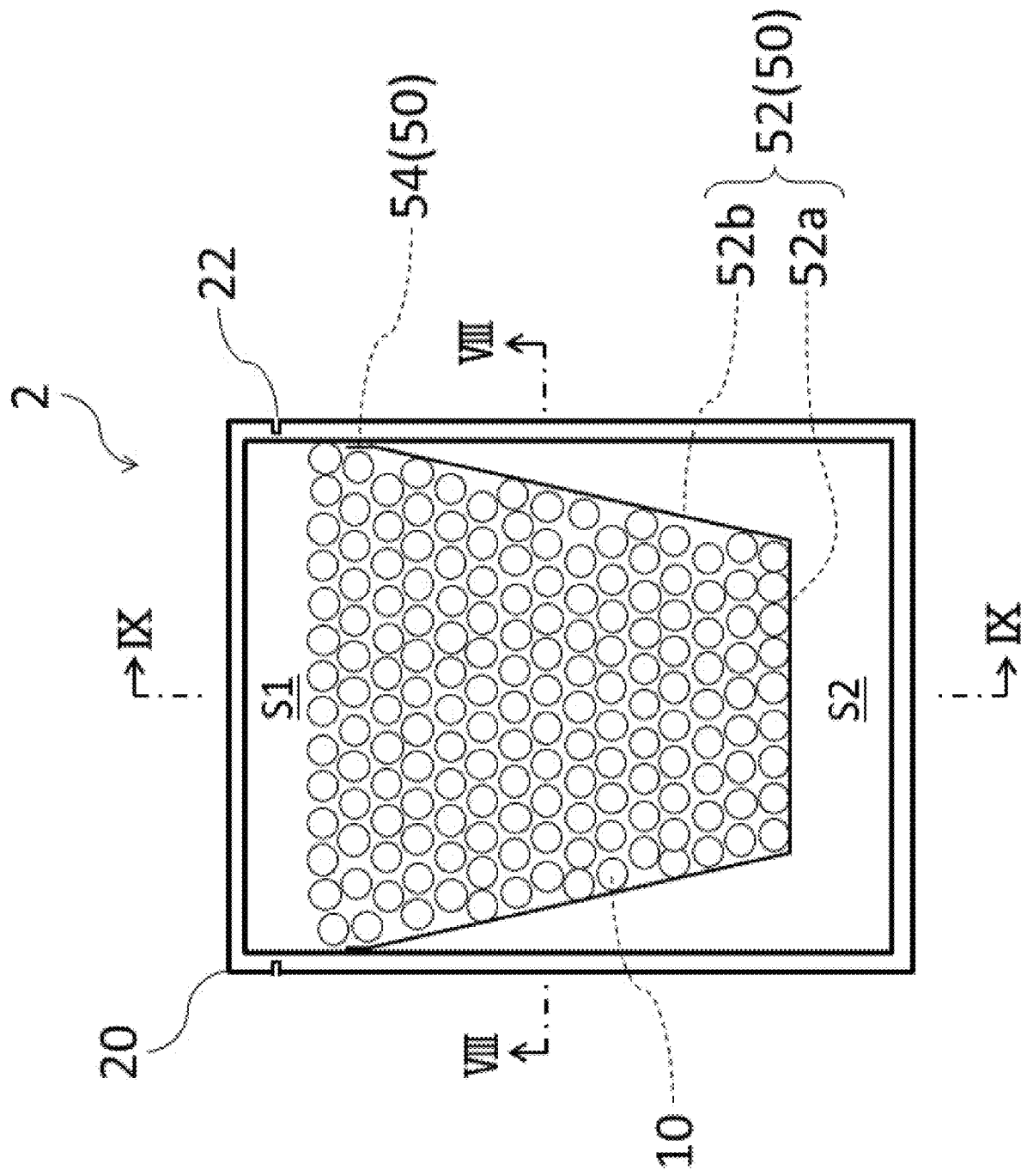
FIG. 7 is a front view showing a second embodiment of the excrement treatment material according to the present invention.
Figure 8:
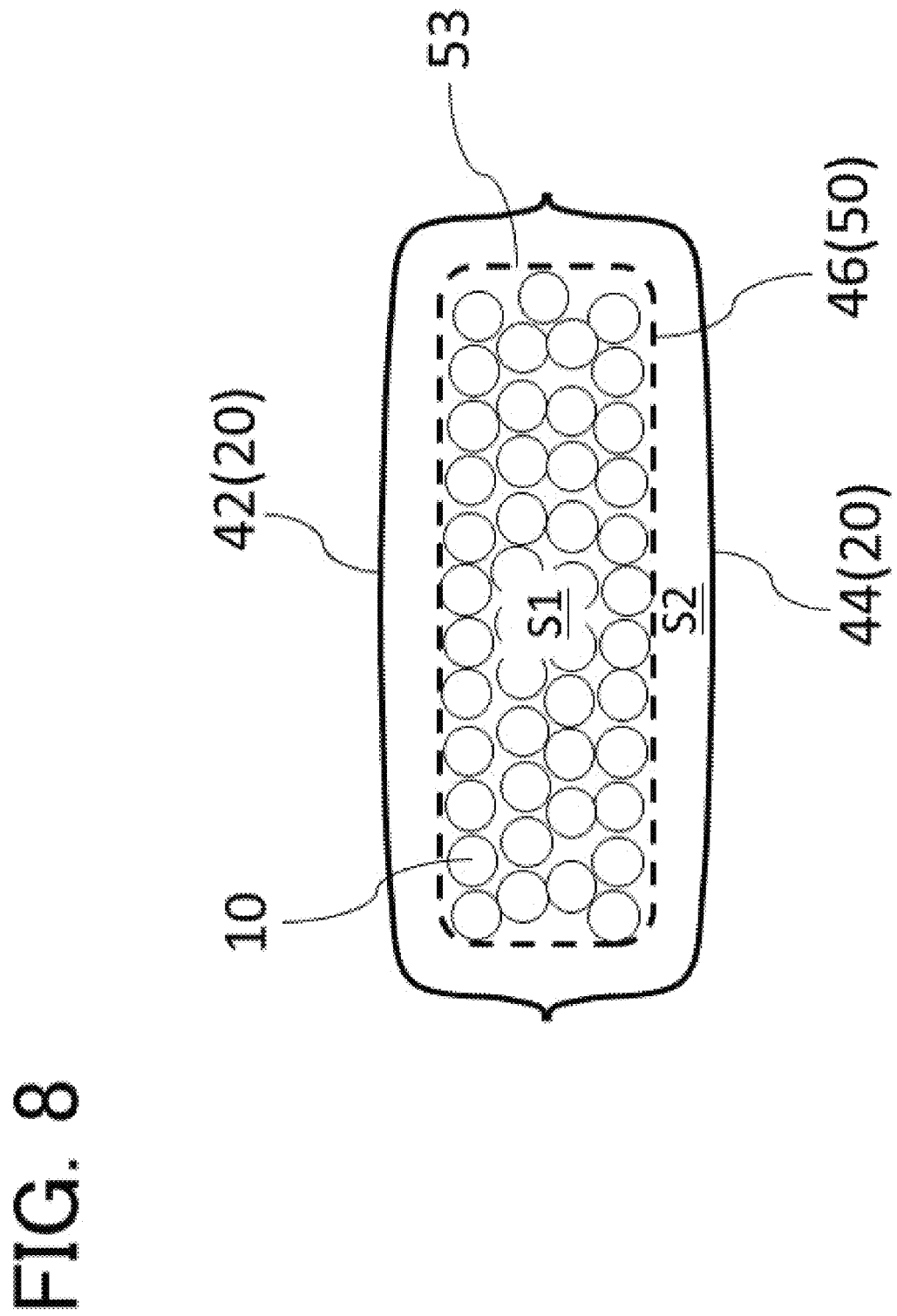
FIG. 8 is a schematic view showing an end face along a line VIII-VIII in FIG. 7.
Figure 9:
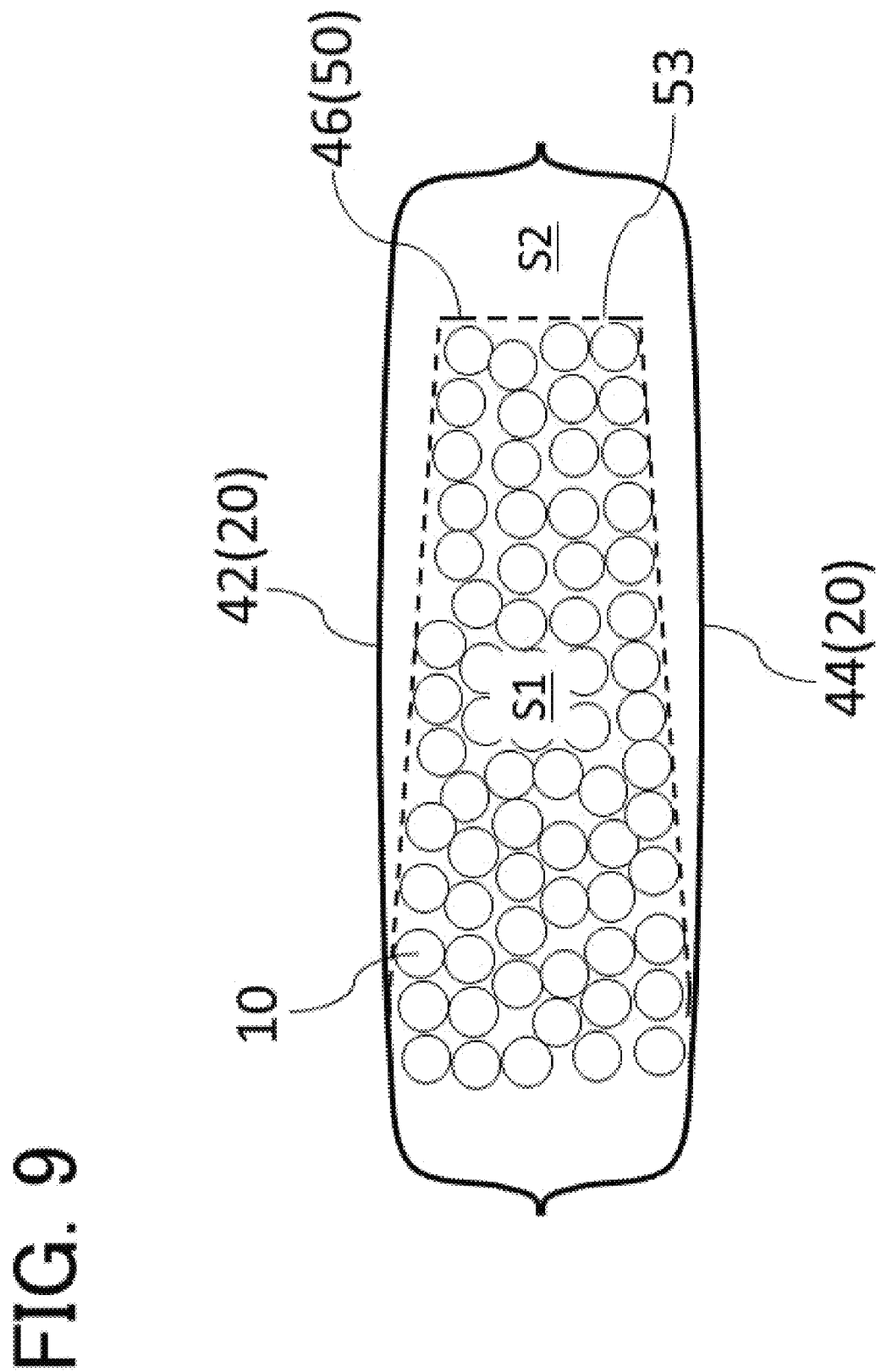
FIG. 9 is a schematic view showing an end face along a line IX-IX in FIG. 7.

FIG. 7 is a front view showing a second embodiment of the excrement treatment material according to the present invention. Also, FIGS. 8 and 9 respectively are schematic views showing an end face along a line VIII-VIII and a line IX-IX in FIG. 7. An excrement treatment material 2 is an excrement treatment material used for treating human or animal excrement, and includes a plurality of granules 10 and a packaging bag 20. The configuration of the granules 10 is the same as that described in the first embodiment. In FIG. 7, for ease of viewing, the interior of the packaging bag 20 is shown with the packaging bag 20 made transparent, and a part of a partition member 50 described later is not shown.

The packaging bag 20 is provided with the partition member 50. The partition member 50 partitions the interior of the packaging bag 20 into a space S1 and a space S2. The space S1 is a space surrounded by a part of the packaging bag 20 (a part above the partition member 50) and the partition member 50. The space S2 is a space surrounded by a part of the packaging bag 20 (a part below the partition member 50) and the partition member 50.

The partition member 50 includes a body portion 52 and a fixed portion 54. The body portion 52 is a portion constituting a boundary between the space S1 and the space S2. The body portion 52 has a bag-like shape having a bottom face 52a and a side face 52b. A mouth of the body portion 52 extends in a plane perpendicular to the vertical direction of the packaging bag 20. The diameter of the body portion 52 decreases monotonously from the mouth of the body portion 52 toward the bottom face 52a. The fixed portion 54 is a portion for fixing the partition member 50 to the inner face of the packaging bag 20. The fixed portion 54 is provided in an annular shape at the periphery of the body portion 52. The fixed portion 54 is provided standing perpendicularly from the periphery of the mouth of the body portion 52, and is adhered to the inner face of the packaging bag 20. Specifically, the entire fixed portion 54 is adhered to the inner face of the packaging bag 20.

Regarding the vertical direction of the packaging bag 20, the mouth of the body portion 52 is located farther from the upper end of the packaging bag 20 than the opening mouth 22. That is, the distance from the mouth of the body portion 52 to the upper end of the packaging bag 20 is greater than the distance from the opening mouth 22 to the upper end of the packaging bag 20. In the present embodiment, the sheet member 46 constitutes the partition member 50.

Figure 10:
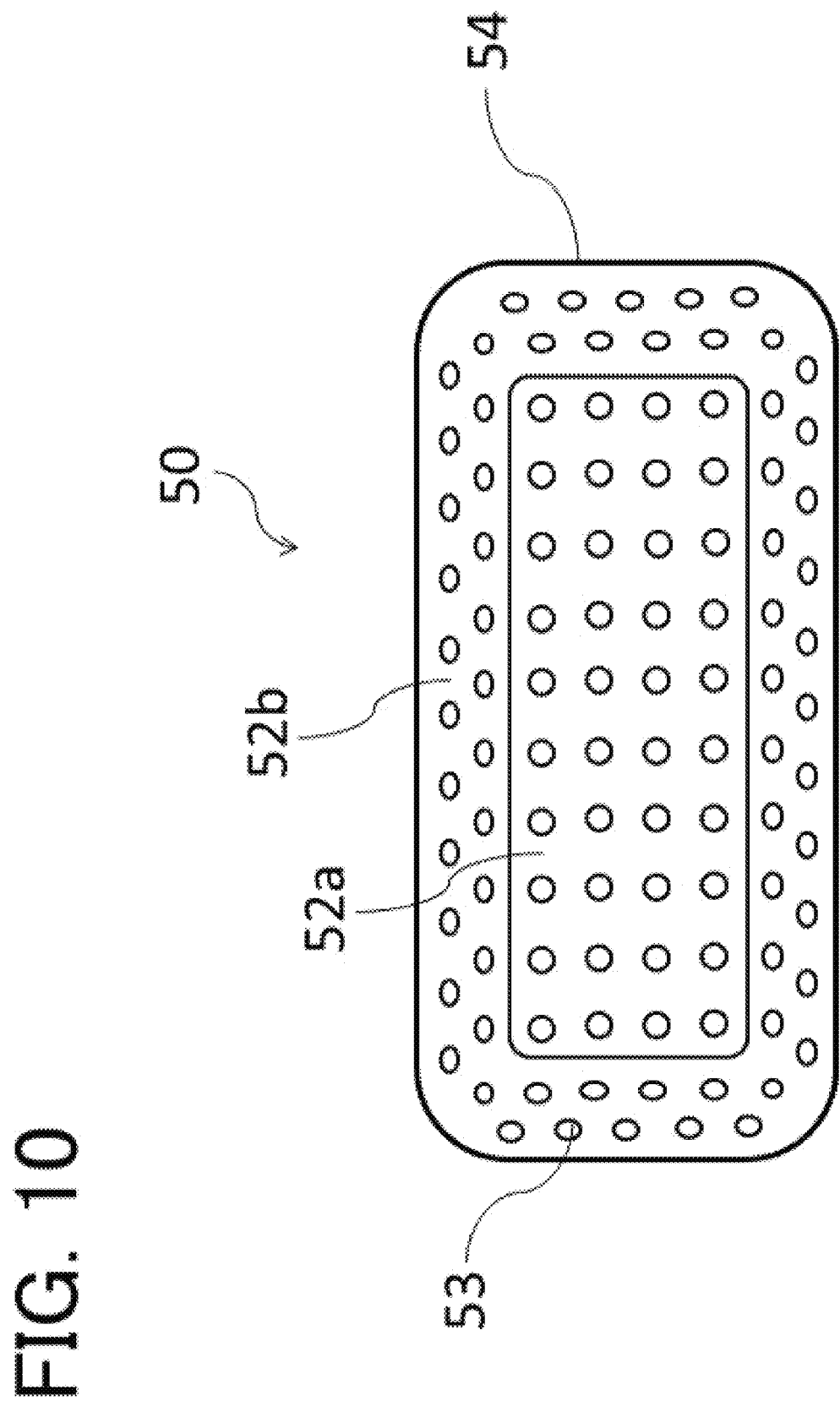
FIG. 10 is a plan view showing a partition member 50.

FIG. 10 is a plan view showing the partition member 50. The partition member 50 has a hole 53. The hole 53 does not allow the granules 10 to pass through. On the other hand, the hole 53 allows the above-described dust to pass through. The hole 53 is circular in a plan view. The diameter of the hole 53 is, for example, about 1 to 3 mm. The partition member 50 has a plurality of the holes 53. The plurality of holes 53 are provided in both the bottom face 52a and the side face 52b. Also, the plurality of holes 53 are scattered over substantially all of the bottom face 52a, and are scattered over substantially all of the side face 52b. The space S1 and the space S2 communicate with each other only through the holes 53. Other configurations of the excrement treatment material 2 are the same as the excrement treatment material 1.

Effects of the excrement treatment material 2 will now be described. In the excrement treatment material 2, the interior of the packaging bag 20 is partitioned into the space S1 and the space S2 by the partition member 50 having the holes 53 that do not allow the granules 10 to pass through. The plurality of granules 10 are accommodated, among the space S1 and the space S2, only in the space S1. Therefore, even if a part of the granules 10 accommodated in the space S1 peels off and becomes dust, some or all of the dust can be moved to the space S2 through the holes 53 of the partition member 50. By accumulating the dust in the space S2 different from the space S1 where the granules 10 are accommodated in this way, when taking the granules 10 out of the packaging bag 20 after opening the packaging bag 20, it is less likely that the dust will be released to outside the packaging bag 20. Therefore, the excrement treatment material 2 making it less likely that the dust accumulated in the packaging bag 20 will be released to outside the packaging bag 20 is realized.

Figure 11:
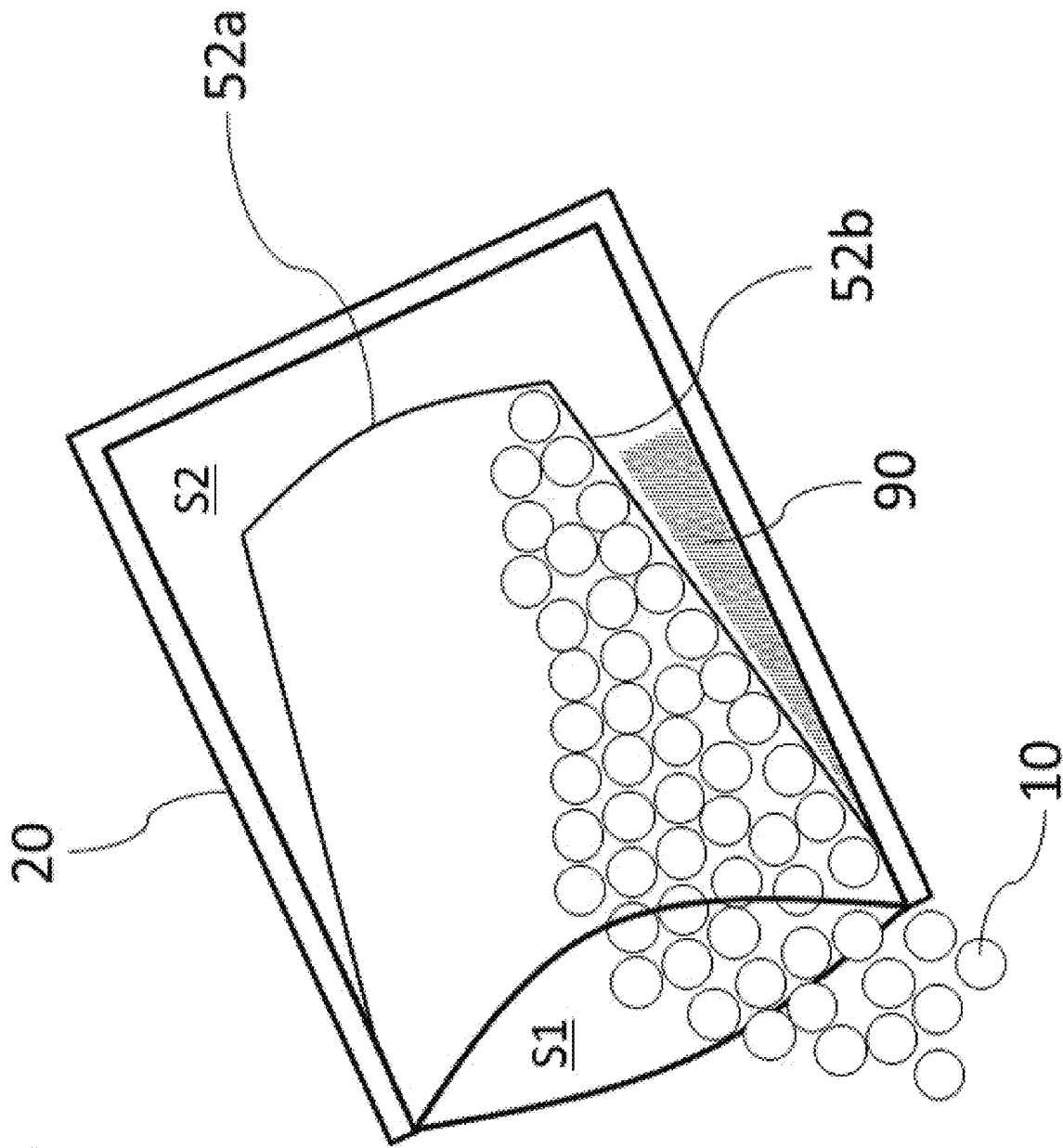
FIG. 11 is a view for explaining effects of an excrement treatment material 2.

The body portion 52 has a bag-like shape having the bottom face 52a and the side face 52b. Therefore, as shown in FIG. 11, even when the packaging bag 20 is tilted so that the upper end (opening portion) of the opened packaging bag 20 is oriented obliquely downward to attempt to take out the granules 10, a dust 90 can be guided to a region between the side face 52b and the inner face of the packaging bag 20 in the space S2. Thus, it is possible to make it less likely that the dust 90 will return from the space S2 to the space S1.

The diameter of the body portion 52 decreases monotonously from the mouth of the body portion 52 toward the bottom face 52a. Therefore, when the packaging bag 20 is tilted to attempt to take out the granules 10 as described above, the dust 90 can easily enter the above-described region.

The mouth of the body portion 52 extends in a plane perpendicular to the vertical direction of the packaging bag 20. Therefore, the interior of the packaging bag 20 can be partitioned vertically.

The partition member 50 has a plurality of the holes 53. In this case, dust is allowed to move more easily from the space S1 to the space S2 than in a case where only one hole 53 is provided.

The plurality of holes 53 are provided in both the bottom face 52a and the side face 52b. Therefore, dust can be moved from the space S1 to the space S2 not only through the holes 53 in the bottom face 52a, but also through the holes 53 in the side face 52b.

The plurality of holes 53 are scattered over substantially all of the bottom face 52a, and are scattered over substantially all of the side face 52b. Such a configuration is advantageous for facilitating movement of the dust from the space S1 to the space S2. Other effects of the excrement treatment material 2 are the same as the excrement treatment material 1.

The present invention is not limited to the above embodiments, and various modifications are possible. In the above-described embodiments, an example case is described in which the plurality of holes 53 are provided in both the bottom face 52a and the side face 52b. However, the plurality of holes 53 may be provided, among the bottom face 52a and the side face 52b, only in the bottom face 52a. In this case, since the holes 53 do not exist in the side face 52b, a circumstance in which the dust 90 (see FIG. 11) guided to the region between the side face 52b and the inner face of the packaging bag 20 returns from the space S2 to the space S1 can be more reliably prevented.

In the above embodiments, an example case is described in which the granules 10 have a multilayer structure including the core portion 12 and the coating portion 14. However, it is not essential to provide the coating portion 14. That is, the granules 10 may have a single-layer structure including only the core portion 12. In this case, the core portion 12 preferably contains an adhesive material.

In the above embodiments, an example case is described in which the water-absorbing granules 10 treat the excrement by absorbing the excrement. However, the granules 10 may be water-permeable granules that treat the excrement by allowing the excrement to pass through. In this case, there are two types of water-permeable granules, one in which the excrement passes through the interior of the granules, and another in which the excrement passes through a gap between the granules. Examples of the latter type include granules having water repellency.

LIST OF REFERENCE SIGNS

1 Excrement treatment material
2 Excrement treatment material
10 Granule
12 Core portion
14 Coating portion
20 Packaging bag
22 Opening mouth
30 Partition member
32 Body portion
33 Hole
34 Fixed portion
42 Sheet member (first sheet member)
44 Sheet member (second sheet member)
46 Sheet member (third sheet member)
50 Partition member
52 Body portion
52a Bottom face
52b Side face
53 Hole
54 Fixed portion
90 Dust
S1 Space (first space)
S2 Space (second space)

The invention claimed is:
1. An excrement treatment material, comprising:
a plurality of granules for treating excrement; and
a packaging bag where the plurality of granules are accommodated,
wherein the packaging bag comprises a partition member that partitions an interior of the packaging bag into a first space and a second space, and has a hole that does not allow the granules to pass through, the plurality of granules are accommodated, among the first space and the second space, only in the first space, the first space is surrounded by a first part of the packaging bag and the partition member, the first part being above the partition member, the second space is surrounded by a second part of the packaging bag and the partition member, the second part being below the partition member, an upper end of the partition member is spaced apart from an upper end of the packaging bag, the partition member comprises a body portion constituting a boundary between the first space and the second space, and a fixed portion that is for fixing the partition member to an inner face of the packaging bag, the body portion has a bag-like shape comprising a bottom face and a side face, the bottom face being farther from the upper end of the packaging bag than the side face in a vertical direction of the packaging bag, and the side face not being adhered to the inner face of the packaging bag, the partition member comprises a plurality of the holes, and the plurality of the holes are in the bottom face but not the side face.

2. The excrement treatment material according to claim 1, wherein a volume of the second space is smaller than a volume of the first space.

3. The excrement treatment material according to claim 2, wherein the volume of the second space is 20% or less of the volume of the first space.

4. The excrement treatment material according to claim 1, wherein the packaging bag comprises an opening mouth for opening the packaging bag, the packaging bag is configured such that by opening the packaging bag from the opening mouth, among the first space and the second space, only the first space is opened, and the upper end of the partition member is located farther from the upper end of the packaging bag than the opening mouth regarding the vertical direction of the packaging bag.

5. The excrement treatment material according to claim 1, wherein a diameter of the body portion decreases monotonously from a mouth of the body portion toward the bottom face.

6. The excrement treatment material according to claim 1, wherein a mouth of the body portion extends in a plane perpendicular to the vertical direction of the packaging bag.

7. The excrement treatment material according to claim 1, wherein the fixed portion is standing perpendicularly from a periphery of the body portion, and is adhered to the inner face of the packaging bag.

8. The excrement treatment material according to claim 7, wherein an entirety of the fixed portion is adhered to the inner face of the packaging bag.

9. The excrement treatment material according to claim 1, wherein the packaging bag has a first sheet constituting a front face of the packaging bag, a second sheet constituting a back face of the packaging bag, and a third sheet constituting the partition member.

10. The excrement treatment material according to claim 1, wherein the granules each have a granular core portion, and a coating portion that covers the core portion.

11. The excrement treatment material according to claim 10, wherein the core portion and the coating portion both have an organic substance as a main material.

* * * * *